United States Patent [19]
Erdelen et al.

[11] Patent Number: 4,960,635
[45] Date of Patent: Oct. 2, 1990

[54] FILM CONSISTING OF ONE OR MORE MONOMOLECULAR LAYERS

[75] Inventors: Christian Erdelen, Wiesbaden; Helmut Ringsdorf; Werner Prass, both of Mainz; Ude Scheunemann, Frankfurt am Main, all of Fed. Rep. of Germany

[73] Assignee: Hoechst Aktiengesellschaft, Frankfurt am Main, Fed. Rep. of Germany

[21] Appl. No.: 244,930

[22] Filed: Sep. 15, 1988

[30] Foreign Application Priority Data

Sep. 19, 1987 [DE] Fed. Rep. of Germany ....... 3731606

[51] Int. Cl.$^5$ .............................................. B32B 5/00
[52] U.S. Cl. .................................... 428/220; 264/298
[58] Field of Search .......................... 428/220; 264/298

[56] References Cited

U.S. PATENT DOCUMENTS 3,892,665  7/1975  Steigelmann et al. .............. 264/298

Primary Examiner—Lewis T. Jacobs
Assistant Examiner—Ralph Dean, Jr.

[57] ABSTRACT

The film consists of one or more Langmuir-Blodgett layers, the layer containing an organic polymer having long-chain fluoroalkyl side groups or consisting of this compound. The film is distinguished by a multilayer structure having few defects and is, for example, suitable for optical purposes and for surface treatment. The order of the molecules in the multilayer can be improved by annealing and by heating the film through the phase transition and cooling again.

14 Claims, No Drawings

FILM CONSISTING OF ONE OR MORE MONOMOLECULAR LAYERS

The invention relates to a film consisting of one or more monomolecular layers of organic polymers having long fluorine-containing side chains on a solid substrate, and layer elements of these compounds.

For the production of ordered layers of organic polymers having long-chain side groups, in addition to physisorption on solid substrates the Langmuir-Blodgett (LB) method is predominantly used. In this method, molecules are spread on a water surface, arranged parallel by reducing the surface area per molecule and applied to a substrate at constant surface pressure by immersion and withdrawal. One monomolecular layer is transferred per immersion operation, the order of the said layer being retained.

For the production of LB layers, amphilic molecules, i.e. molecules which have a hydrophilic end (a "head") and a hydrophobic end (a "tail") are used. There are monomeric amphilic molecules in which perfluorinated alkyl chains serve as hydrophobic units. In order to achieve greater stability of the LB films, polymeric LB films have also been prepared. In these, both monomeric amphiphiles, which can be polymerized after application, and organic polymers having long alkyl side chains can be used for layer production. However, in both types of polymeric LB films the achievable order in the layer is lower than in monomeric films since contraction of the amphiphiles occurs (leading to the formation of defects) in virtually every case during polymerization of the layer and, because of the high viscosity of the monolayer, polymers cannot be transferred as readily as monomeric amphiphiles to a substrate.

It has now been found that the films of organic polymers which carry fluorinated alkyl chains as side groups possess high internal order. The films can be produced, for example, by the Langmuir-Blodgett technique. After the production process, the order of molecules in the layers can be subsequently improved by heating through the phase transition of the film and cooling again.

The invention relates to a film of one or more monomolecular layers of an amphiphilic compound, wherein the layer contains, or consists of, an organic polymer having long-chain fluorinated alkyl side groups. In these layers the side groups are oriented in the same sense, parallel to one another and essentially at right angles to the plane of the layer. Suitable alkyl side groups are those of the formula I $$CF_3-(CF_2)_n-(CH_2)_m- \quad (I)$$

in which n denotes a number from zero to 23, preferably from 5 to 11, and m denotes a number from zero to 24, preferably from zero to 8. It is preferable if (n+m) is not less than 6.

The polymers are amphiphilic and preferably contain, as polar groups ("hydrophilic tails"),

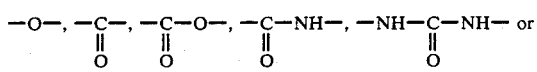

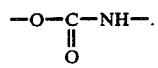

Polymers of this type are obtainable by free radical polymerization of monomers of the formula II $$CF_3-(CF_2)_n-(CH_2)_m-X-R^1 \quad (II)$$

in which m and n have the abovementioned meaning.
X is a radical

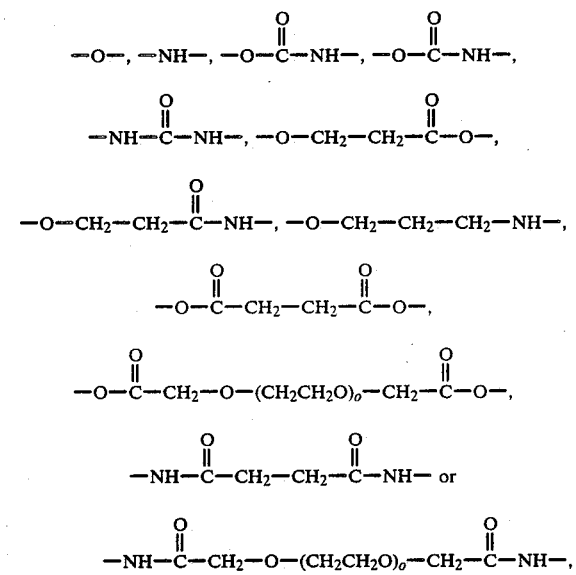

o being a number from zero to 10.
$R^1$ is a radical

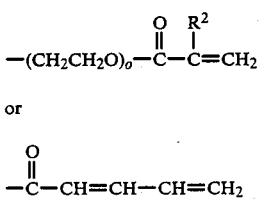

or

in which o has the abovementioned meaning and $R^2$ is —H, —$CH_3$, —CN, —CL or —F.

It is possible to use both homopolymers and copolymers, copolymers being preferred and the comonomer being a monomer of the formula II or III:

in which $R^2$ has the abovementioned meaning and $R^3$ is

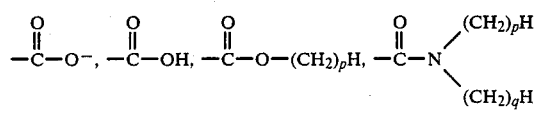

or

p and q are a number from zero to 24 and r is a number from 1 to 10.

Preferably used monomer units of the formula III are acrylic acid or acrylic acid derivatives, for example methacrylic acid and methacrylic acid derivatives. The comonomer is preferably water-soluble.

Furthermore, the abovementioned homopolymers and copolymers can also be used as a mixture with other amphiphilic substances. Examples of such substances are long-chain fatty acids, long-chain alcohols, long-chain amines, long-chain amides or compounds of the formula IV

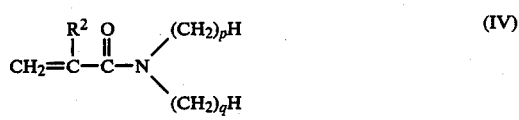

in which $R^2$, p and q have the abovementioned meanings. The amount of polymer with fluoralkyl side groups is preferably at least 10 wt.-%, especially at least 20 wt.-%. Solvents or other impurities may be present besides other amphiphilic substances.

For the production of the films according to the invention, the organic polymers are dissolved in a highly volatile solvent and applied to (spread on) the water surface in a Langmuir-Blodgett film balance. The mean area per repeat unit is calculated from the dimensions of the surface, the spreading volume and the concentration of the solution. Phase transitions during compression of the molecules can be monitored in the shear-area isotherm.

The molecules are compressed with a barrier, the chains being oriented essentially at right angles to the boundary layer with increasing density. During the compression, self-organization of the molecules at the boundary layer results in the formation of a highly ordered, monomolecular film whose constant layer thickness is determined by the chain length of the molecules and their angle of tilt (i.e. the angle through which the molecular chains on the water surface are tilted with respect to the normal). The typical thickness of such a film is 2 to 3 nm.

The film is removed from the water surface at constant surface pressure by immersion or withdrawal of a suitable substrate, with retention of the order. The order of the layer can be improved by heating the film above the phase transition temperature into the isotropic phase, i.e. melting the side chains (disappearance of the X-ray reflections) and cooling again. It is also possible for the film to be kept for some time (for example several hours) just below (e.g. 0.5°–5° C.) the transition to a liquid crystalline system or to the isotropic phase. The phase transitions and the increase in the order of the side chains can be detected from the X-ray reflections.

Suitable substrates are any solid, preferably dimensionally stable substrates of various materials. The substrates used as a substrate for the layer can be, for example, transparent or translucent, electrically conductive or insulating. The substrate can be hydrophobic or hydrophilic. The surface of the substrate on which the LB layer is applied can be rendered hydrophobic. The substrate surface to be coated should be as pure as possible so that the formation of a thin, ordered layer is not interfered with. In particular, the presence of surfactants on the substrate surface to be coated can have an adverse effect on layer production. It is possible for the substrates used as a layer substrate to be provided, on the surface to be coated, prior to application of the LB films, initially with an intermediate layer in order, for example, to improve the adhesion of the film to the substrate.

Examples of suitable materials for the substrates are metals, such as, for example, gold, platinum, nickel, palladium, aluminum, chromium, niobium, tantalum, titanium, steel and the like. Other suitable materials for the substrates are plastics, such as, for example, polyesters, such as polyethylene terephthalate or polybutylene terephthalate, polyvinyl chloride, polyvinylidene chloride, polytetrafluoroethylene, polyethylene or polypropylene.

Semiconductors, such as silicon or germanium, glass, silica, ceramic materials or cellulose products are also suitable for the substrate. The surface of glass and other hydrophilic substrates can, if required, be rendered hydrophobic in a manner known per se, for example by reaction with alkylsilanes or hexamethyldisilazane. The choice of the substrate materials depends primarily on the intended use of the layer elements produced from the films according to the invention. For optical elements, as a rule transparent, translucent substrates are used as a base for the layers. If, for example, the layer elements according to the invention are used in the electrical industry or in electrochemical processes, the substrates used are, in particular, electrically conductive materials, such as metals or metallic surface layers, for example on plastic sheets.

The substrates which serve as a base for the films according to the invention can have any shapes, depending on their intended use. For example, they can be film-like, sheet-like, plate-like, belt-like or cylindrical or can be selected from any other shapes. In general, the bases for the layer are flat, even substrates, such as, for example, films, sheets, plates, belts and the like. The substrate surface to be coated is preferably smooth, as is usual for the production of LB films. In the case of flat, even substrates, the films according to the invention can be applied to one or both surfaces of the substrate.

The film according to the invention is distinguished by a stable and at the same time highly ordered multilayer structure having few defects.

Such films on substrates are suitable, for example, in optical waveguide systems or for the production of filters for optical purposes. Because of the low critical surface tension, the films are also suitable for improving the frictional properties of materials, for the production of protective layers and for other relevant applications.

The invention is illustrated in more detail by the Examples which follow.

EXAMPLE 1

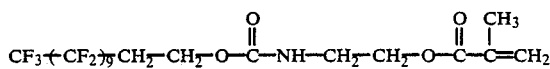

About 0.7 cm³ (690 mg, 4.4 mmol) of freshly distilled isocyanatoeth-2-yl methacrylate was added to a solution of 2 g (3.55 mmol) of 1H,1H,2H,2H-perfluorododecanol and a spatula tip of 2,6-di-tert-butyl-p- cresol as an inhibitor in absolute dichloromethane under dry nitrogen, followed by 2 drops of triethylamine as basic catalyst. After boiling under reflux for 10 hours, stripping off the solvent in a rotary evaporator and recrystallizing twice from a 1:2 (v/v) mixture of dichloromethane and petroleum ether, 2.2 g (=85% of the theoretical yield) of pure 1H,1H,2H,2H-perfluorododecyl N-(methylacryloxyethyl)-carbamate were obtained. The melting point of the pure compound was 71° C. Elemental analysis gave: C: 32.5% (calculated: 31.7%), H: 1.8% (calculated: 2.0%), F: 56.0% (calculated: 55.5%), N: 1.7% (calculated: 1.9%).

EXAMPLE 2

Homopolymerization of 1H,1H,2H,2H-perfluorodecyl methacrylate 750 mg of the monomer 1H,1H,2H,2H-perfluorodecyl methacrylate were dissolved in 7.5 cm$^3$ of trifluorotoluene, 12.4 mg (5 mol %) of tert-butyl peroxyisopropylcarbonate (TBPIC) were added and the reaction solution was flushed with argon for 10 minutes and then degassed four times in vacuo. Thereafter, the mixture was heated for 18 hours at 90° C. The product was then precipitated by pouring the mixture into 200 cm$^3$ of dichloromethane, the precipitating agent was removed by decantation and the polymer separated off by centrifuging and dried in vacuo (yield: 234 mg; 31% of theory). Elemental analysis gave: C: 31.5% (calculated: 31.6%), H, 1.7% (calculated: 1.7%), F: 61.2% (calculated: 60.7%).

EXAMPLE 3

Homopolymerization of 1H,1H,2H,2H-perfluorododecyl N-(methacryloxyethyl)-carbamate 300 mg of the monomer prepared in Example 1 were dissolved in 7 cm$^3$ of dioxane, 3.97 mg (5 mol %) of azobisisobutyronitrile (AIBN) were added and the reaction solution was flushed with argon for 10 minutes and then degassed four times in vacuo. Thereafter, the mixture was heated for 18 hours at 60° C. The product was then precipitated by pouring the mixture into 200 cm$^3$ of petroleum ether, the precipitating agent was removed by decantation and the polymer was separated off by centrifuging and dried in vacuo (yield: 184 mg; 61% of theory). Elemental analysis gave: C: 33.2% (calculated: 33.0%), H: 2.6% (calculated: 2.3%), F: 46.1% (calculated: 52.2%), N: 2.2% (calculated: 2.3%).

EXAMPLE 4

Copolymerization of 1H,1H,2H,2H-perfluorodecyl methacrylate with 2-hydroxyethyl methacrylate 120 mg of the monomer 1H,1H,2H,2H-perfluorodecyl methacrylate and 130.9 mg of the comonomer 2-hydroxyethyl acrylate were dissolved in 5 cm$^3$ of dioxane, 5.55 mg (2.5 mol %) of azobisbutyronitrile (AIBN) were added and the reaction solution was flushed with argon for 10 minutes and then degassed four times in vacuo. Thereafter, the mixture was heated for 10 hours at 60° C. The product was then precipitated by pouring the mixture into 200 cm$^3$ of petroleum ether, the precipitating agent was removed by decantation and the polymer was separated off by centrifuging and dried in vacuo (yield: 212 mg; 84% of theory). Elemental analysis gave: C: 40.9% (calculated 42.1%), H: 4.5% (calculated: 4.4%), F: 30.1% (calculated: 29.0%). The calculated values are based on a copolymer composition which corresponds to the composition of the starting monomer mixture.

EXAMPLE 5

Preparation and X-ray characterization of LB films of poly-(1H,1H,2H,2H-perfluorodecyl) methacrylate A rectangular piece of a polyester sheet (160×26 mm) was clamped on a rectangular PTFE substrate (76×26×3 mm), and the substrate with the sheet was cleaned by rinsing, first with diethyl ether and then with deionized water.

Layers of the polymer prepared in Example 2 were transferred to the sheet by the Langmuir-Blodgett method, by spreading 0.25 cm$^3$ of a solution of 5 mg of the polymer in 10 cm$^3$ of trichlorotrifluoromethane on an aqueous subphase at a subphase temperature of 30° C. in a Langmuir film balance. By reducing the water surface covered by monofilm, the shear was adjusted to 20 mN/m and kept constant at this value. The substrate was then immersed vertically from above through the water surface into the film balance (immersion speed: 0.3 mm/sec) and, after a short pause (10 seconds) at the lower point of reversal, was withdrawn again (withdrawal speed: 0.2 mm/sec). A monolayer was transferred to the substrate both during the immersion process and during the withdrawal process. By carrying out the dipping process repeatedly after a waiting time of 9 minutes at the upper point of reversal in each case, 17 double layers were transferred to the substrate.

To determine the layer spacings in the multilayer, the film was investigated by X-ray diffraction in a powder diffractometer (D 500 from Siemens) using nickel-filtered Cu Kα radiation (λ=0.1541 nm). From the diffraction peak at 2 theta=3.05°, a layer spacing of 2.9 nm was calculated.

In order to determine the temperature dependence of the multilayer, the X-ray measurements were carried out at various temperatures. The diffraction peak at 2 theta=3.05° was not very strong. No change was observed as a result of increasing the temperature to 50° and 70° C.; cooling again to room temperature resulted in an increase in the order in the film, which was evident from the slight increase in the intensity of the diffraction peak. By heating the sample again to 100°-130° C., the multilayer was melted and no longer showed any layer order; on cooling to room temperature, however, the polymers become ordered again into layers. The resulting order was, however, far greater than in the case of the original samples. In addition to the first-order layer reflex, which was now substantially more intense, a second-order reflection was also measurable. The original layer reflex was, however, slightly shifted and now occurred at 2 theta=3.15° (corresponding to a double-layer spacing of 2.8 nm).

COMPARATIVE EXAMPLE A

Preparation and X-ray characterization of LB films of polyoctadexyl methacrylate A rectangular piece of a polyester sheet was cleaned as in Example 5 and, as in Example 5, layers of polyoctadecyl methacrylate were transferred by the Langmuir-Blodgett method (subphase: water at 30° C., shear: 18 mN/m, immersion and withdrawal speed: 0.3 mm/sec, pause at upper point of reversal: 6 min). In the case of this compound, a monolayer was transferred in each case only during withdrawal of the substrate. A total of 23 layers were applied to the sheet.

The layer spacings were determined by X-ray diffraction as in Example 5. The layer reflection was at 2 theta=2.8°, corresponding to a layer spacing of 3.1 nm. When the substrate was heated to 50° C., the multilayer melted and the diffraction peak vanished. Reordering of the layer on cooling, as was observed in the case of fluorinated polymer, did not occur here.

EXAMPLE 6

Preparation and X-ray characterization of LB films of a copolymer of 1H,1H,2H,2H-perfluorodecyl methacrylate and 2-hydroxyethyl acrylate A rectangular piece of polyester sheet was cleaned as in Example 5, and as in Example 5, layers of the copolymer prepared in Example 4 were transferred by the Langmuir-Blodgett method (subphase: water at 30° C., shear 50 mN/m, immersion and withdrawal speed: 0.3 mm/sec, pause at upper point of reversal: 6 min). A monolayer was transferred in each case both during immersion and during withdrawal of the substrate. A total of 15 double layers were applied to the sheet.

The layer spacings were determined by X-ray diffraction as in Example 5. The layer reflex, which was very sharp in comparison with the homopolymer in Example 5, was at 2 theta=2.05°, corresponding to a layer spacing of 4.3 nm. In addition to this reflection, second and third orders were also detectable. On heating the substrate to 40° C., the intensity of the reflection increased further. On the other hand continued heating resulted in a decrease in its intensity, i.e. the order of the multilayer decreased. Further heating to 120° C. finally caused the diffraction peak to vanish completely. When the sample was cooled, the diffraction peak reappeared in the same position. This behavior corresponds to that of the polymer in Example 5.

COMPARATIVE EXAMPLE B

Preparation and X-ray characterization of LB films of a copolymer of octadecyl methacrylate and 2-hydroxyethyl methacrylate A rectangular piece of polyester sheet cleaned as in Example 5 and, as in Example 5, layers of a copolymer of octadecyl methacrylate and 2-hydroxyethyl methacrylate (monomer ratio: 1:5) were transferred by the Langmuir-Blodgett method (subphase: water at 20° C., shear: 30 mN/m, immersion speed: 0.8 mm/sec, withdrawal speed: 0.3 mm/sec, pause at upper point of reversal: 9 min). A monolayer was transferred in each case both during immersion and during withdrawal of substrate. A total of 19 double layers were applied to the sheet.

The layer spacings were determined by X-ray diffraction as in Example 6. The layer reflection, which here too was very sharp in comparison with the homopolymer in Example 6, was at 2 theta=1.55°, corresponding to a layer spacing of 5.7 nm. On heating, it was observed that the multilayer showed little temperature sensitivity up to 100° C. However, as soon as the multilayer had melted at about 150° C., no reorganization occurred on cooling.

EXAMPLE 7

Critical surface tension of LB films of poly-(1H,1H,2H,2H-perfluorodecyl) methacrylate A small silicon plate (4 cm×1 cm) was cut from a silicon wafer and cleaned as follows:

1. Treatment for 1 hour in an ultrasonic bath in a mixture of one part of 30% strength $H_2O_2$ and four parts of concentrated sulfuric acid. Then rinse with clean water.
2. Immerse for 20 seconds in ammonium fluoride-buffered HF solution and then rinse with clean water.

After this treatment, the small silicon plates were hydrophobic (angle of contact with water: 75°). Layers of poly-(1H,1H,2H,2H-perfluorodecyl) methacrylate were transferred to the small silicon plate as in Example 5, by the Langmuir-Blodgett method (subphase: water at 30° C., shear: 20 mN/m, immersion speed: 1.8 cm/min, withdrawal speed: 1.2 cm/min, pause at the upper point of reversal: 9 min). A monolayer was transferred in each case both during immersion and during withdrawal. A total of 4 double layers were transferred.

Liquid drops of a number of n-alkanes ($C_7H_{16}$–$C_6H_{34}$) were applied to the surface of the transferred layers, and the angle of contact of the liquid drops with the surface was measured. The critical surface tension was determined from these angles of contact by the Zisman method. The result of the determination was a critical surface tension of 10.5 mN/m.

EXAMPLE 8

Ellipsometric measurements on LB films of a copolymer of 1H,1H,2H,2H-perfluorodecyl methacrylate and 2-hydroxyethyl acrylate A small silicon plate was cleaned as in Example 7 and coated by the Langmuir-Blodgett method, analogously to Example 6, with 18, 24, 30, 36, 44, 50 and 60 monolayers of the polymer prepared in Example 4.

By means of ellipsometric measurements, the layer thicknesses and the refractive index of the LB films were then measured. (Result: refractive index at 633 nm: 1.43±0.05).

EXAMPLE 9

Measurement of the thermal stability of LB films of a copolymer of 1H,1H,2H,2H-perfluorodecyl methacrylate and 2-hydroxyethyl acrylate by thermal desorption measurements A small silicon plate (4 cm×1 cm) was cut from a thermally oxidized silicon wafer (thickness of the oxide layer: 160 nm) and treated for one hour in an ultrasonic bath in a mixture of one part of 30% strength $H_2O_2$ and four parts of concentrated sulfuric acid. Thereafter, the small plate was treated for a further 15 minutes in an alkaline cleaning bath at a temperature of 50° C. using ultrasound and then rinsed thoroughly with clean water and dried in a warm air stream. Hydrophobic properties were then imparted by treatment with hexamethyldisilazane vapor (10 minutes at 70° C.).

Coating by the LB method with 8 layers was then carried out using the copolymer prepared in Example 4, as described in Example 8.

The coated substrate was heated in a special apparatus with a linear temperature gradient (0.5° C./sec). During the heating process, the thickness of the LB layer was measured from the intensity of a laser beam (633 nm) reflected by the sample and polarized at right angles.

The desorption temperature determined from this was 300° C.

We claim:

1. A film consisting essentially of at least one monomolecular layer of an amphiphilic compound, wherein the layer contains an organic polymer having long-chain fluoroalkyl side groups of the formula I $$CF_3-(CF_2)_n-(CH_2)_m- \quad \text{(I)}$$

in which n is a number from zero to 23 and m is a number from zero to 24, said side groups being oriented in the same sense, parallel to one another and essentially at right angles to the plane of the layer, said organic polymer having been obtained by free radical polymerization of a monomer of formula II $$CF_3-(CF_2)_n-(CH_2)_m-X-R^1 \quad \text{(II)}$$

in which
m and n are as defined previously;
X is a radical $$-O-, \ -NH-, \ -O-\overset{O}{\underset{\|}{C}}-NH-, \ -NH-\overset{O}{\underset{\|}{C}}-NH-,$$

$$-O-CH_2-CH_2-\overset{O}{\underset{\|}{C}}-O-, \ -O-CH_2-CH_2-\overset{O}{\underset{\|}{C}}-NH-,$$

$$-O-CH_2-CH_2-CH_2-NH-,$$

$$-O-\overset{O}{\underset{\|}{C}}-CH_2-CH_2-\overset{O}{\underset{\|}{C}}-O-,$$

$$-O-\overset{O}{\underset{\|}{C}}-CH_2-O-(CH_2CH_2O)_o-CH_2-\overset{O}{\underset{\|}{C}}-O-,$$

$$-NH-\overset{O}{\underset{\|}{C}}-CH_2-CH_2-\overset{O}{\underset{\|}{C}}-NH- \quad \text{or}$$

$$-NH-\overset{O}{\underset{\|}{C}}-CH_2-O-(CH_2CH_2O)_o-CH_2-\overset{O}{\underset{\|}{C}}-NH-,$$

o being a number from zero to 10; and
$R^1$ is a radical $$-(CH_2CH_2O)_o-\overset{O}{\underset{\|}{C}}-\overset{R^2}{\underset{|}{C}}=CH_2 \ \text{or} \ -\overset{O}{\underset{\|}{C}}-CH=CH-CH=CH_2$$

in which o has the abovementioned meaning and $R^2$ is
—H, —CH$_3$, —CN, —CL or —F.

2. A film as claimed in claim 1, wherein, in said organic polymer, the value of n+m is not less than 6.

3. A film as claimed in claim 2, wherein n is 5 to 11 and m is zero to 24.

4. A film as claimed in claim 11, wherein said organic polymer is a copolymer derived from a monomer of said formula II and a comonomer of the formula III $$\overset{R^2}{\underset{|}{CH_2=C-R^3}} \quad \text{(III)}$$

in which $R^2$ is as defined in claim 1 and $R^3$ is $$-\overset{O}{\underset{\|}{C}}-O^-, \ -\overset{O}{\underset{\|}{C}}-OH, \ -\overset{O}{\underset{\|}{C}}-O-(CH_2)_pH, \ -\overset{O}{\underset{\|}{C}}-N\overset{(CH_2)_pH}{\underset{(CH_2)_qH}{}}$$

or $$-\overset{O}{\underset{\|}{C}}-O(CH_2CH_2O)_rH;$$

wherein p and q are each a number from zero to 24 and r is a number from 1 to 10.

5. A film as claimed in claim 4, wherein said comonomer of formula III is acrylic acid or a derivative thereof.

6. A film as claimed in claim 1, wherein the layer contains an amphiphilic mixture comprising at least 10% by weight of said organic polymer having long-chain fluoroalkyl side groups and a second amphiphilic substance.

7. A film as claimed in claim 1, wherein the layer consists of said organic polymer or an amphiphilic mixture consisting essentially of at least 10% by weight of said organic polymer and a second amphiphilic substance.

8. A film as claimed in claim 1, which consists of two or more monomolecular layers of different compositions, a layer which contains, or consists of, an organic polymer having long-chain fluoroalkyl side groups alternating with a layer which contains or consists of another amphiphilic compound.

9. A process for the production of a film as claimed in claim 1, wherein a film is produced on a liquid surface from an amphiphilic organic polymer having long-chain fluoroalkyl side groups, and the film is transferred to a substrate and where the order of the molecules of the film transferred to the substrate is improved by heating to a temperature close to a phase transition and then cooling again.

10. A process as claimed in claim 9, wherein the film is heated to a temperature just below a phase transition to a liquid crystalline system or from a liquid crystalline system to an isotropic system, which phase transition is observable by X-ray diffraction, is kept at this temperature until an increase in the order visible from a sharpening of the X-ray diffraction lines occurs and is then cooled again.

11. A process as claimed in claim 9, wherein the film is heated to a temperature at which the X-ray diffraction lines vanish and is then cooled again.

12. A method for reducing friction between surfaces comprising the step of treating said surfaces with the film of claim 1.

13. An optical waveguide or filter comprising a substrate treated with a film of claim 1.

14. A method for altering the optical properties of a transparent substrate comprising the step of applying to the substrate a film of claim 1.

* * * * *